United States Patent [19]

Sassano

[11] Patent Number: 4,520,161

[45] Date of Patent: May 28, 1985

[54] HIGH HOT BOND STRENGTH HIGH FLASH POINT LOW VISCOSITY POLYESTER INSULATING COMPOSITIONS

[75] Inventor: Daniel R. Sassano, Monroeville, Pa.

[73] Assignee: Westinghouse Electric Corp., Pittsburgh, Pa.

[21] Appl. No.: 620,666

[22] Filed: Jun. 14, 1984

[51] Int. Cl.$^3$ .................... C08G 63/76; C08L 67/06
[52] U.S. Cl. ........................... 525/11; 525/30; 528/303; 528/304
[58] Field of Search ............... 528/303, 304; 525/11, 525/30, 443

[56] References Cited

U.S. PATENT DOCUMENTS

| | | | |
|---|---|---|---|
| 3,709,777 | 1/1973 | Takikawa et al. | 428/481 |
| 3,953,403 | 4/1976 | Fujiyoshi et al. | 525/437 |
| 4,016,330 | 4/1977 | Laganis | 525/30 X |
| 4,391,947 | 6/1983 | Sassano | 525/11 |

*Primary Examiner*—Lucille M. Phynes
*Attorney, Agent, or Firm*—Daniel P. Cillo

[57] ABSTRACT

A fluid, highly heat stable, insulating composition is made by admixing: (A) from 9 mole % to 12 mole % of selected unsaturated cyclic dicarboxylic acid; (B) from about 15 mole % to about 20 mole % of an unsaturated aliphatic dicarboxylic acid; (C) from about 35 mole % to about 40 mole % of an aliphatic dihydric alcohol; (D) from about 25 mole % to about 40 mole % of diallyl phthalate copolymerizable monomer; and (E) an inhibiting agent, to provide a polyester; and from 15 parts by weight to 30 parts by weight of hexa methoxy methyl melamine per 100 parts by weight of polyester.

12 Claims, No Drawings

HIGH HOT BOND STRENGTH HIGH FLASH POINT LOW VISCOSITY POLYESTER INSULATING COMPOSITIONS

BACKGROUND OF THE INVENTION

Polyester resin compositions are well known in the art. Takikawa et al., for example, in U.S. Pat. No. 3,709,777, taught organic, solvent based polyester impregnating resins for decorative laminates. The resin contained: phthalic acid; mixed alcohol, including propylene glycol and an ethylene glycol type; unsaturated aliphatic dicarboxylic acid selected from one or both of maleic acid and fumaric acid; diallyl phthalate prepolymer; peroxide catalyst; release agent such as a wax; and organic solvent such as a ketone. In the area of powder coating compositions, Fujiyoshi et al., in U.S. Pat. No. 3,953,403, taught powdered polyester resins containing: terephthalic acid; glycol; dicarboxylic acid selected from maleic acid, maleic anhydride, fumaric acid, citraconic acid, mesaconic acid, itaconic acid, or the like; stabilizers and modifiers, such as benzoin, benzophenone, benzilic acid, para-phenylphenol or stearyl alcohol; cross-linking agent such as hexamethyoxymethyl melamine; and peroxide catlyst. Neither of these formulations would be particularly useful as a high bond strength polyester electrical insulating composition.

Sassano, in U.S. Pat. No. 4,391,947, provides polyester insulating compositions having good heat stability. The Sassano compositions contain: a polyester component admixture of from about 15 to 40 mole % of isophthalic acid, tetrahydrophthalic acid, and/or endo methylene tetrahydrophthalic acid; neopentyl glycol as sole aliphatic dihydric alcohol; unsaturated aliphatic dicarboxylic acid; dual inhibitor mixture of hydroquinone and mono tertiary butyl hydroquinone; solubilizer such as triethyl phosphate; and 25 to 35 mole % of copolymerizable monomer, such as vinyl toluene; all mixed with from 0 to about 10 parts of an optional melamine-formaldehyde resin, per 100 parts by weight of polyester component. This provides an outstanding solventless, low viscosity, dipping and impregnating polyester. However, even further improvement of flash point and bond strength at high temperatures, and catalyzed storage stability at temperatures over 30° C. are required for some electrical insulating resins in the class F-H thermal capability range, especially for dip applications.

SUMMARY OF THE INVENTION

The above need has been met by providing a fluid, solventless, dipping and impregnating insulating resin having high temperature bond strength, high flash point, and long, catalyzed storage stability even at temperatures approaching 55° C. The polyester component of the resin contains: from 9 mole % to 12 mole % of selected unsaturated cyclic dicarboxylic acid, from about 15 mole % to about 20 mole % of unsaturated aliphatic dicarboxylic acid; from about 35 mole % to about 40 mole % of an aliphatic dihydric alcohol; from about 25 mole % to about 40 mole % of diallyl phthalate as the copolymerizable unsaturated vinyl monomer, providing excellent flash point temperatures; and an inhibitor, preferably a combination consisting of: about 200 ppm to about 400 ppm of hydroquinone with about 100 ppm to about 200 ppm of mono tert butyl hydroquinone.

Hexamethoxy methyl melamine, is added in the range of from 15 parts by weight to 30 parts by weight per 100 parts by weight of the polyester component of the resin, providing excellent bond strength. Preferably, small quantities, about 0.2 part by weight to about 0.4 part by weight, of dimethyl ethanol amine are added to 100 parts by weight of the polyester component of the resin, to provide high temperature storage stability, in combination with the inhibitor. Additionally, an effective amount of free radical initiator catalyst, preferably dicumyl peroxide, is added, preferably from about 1 part to about 2 parts per 100 parts by weight of the polyester component.

These coating compositions can be applied by vacuum pressure impregnation or large tank dip methods. They can be used for form wound as well as random wound motors and generators. These resins can be manufactured to give low to medium viscosities, i.e., about 300 cps. to about 1,750 cps. at 25° C., for excellent penetration through mica paper or glass fiber, to provide insulating tapes. They possess high polyester to monomer content and long catalyzed stability at ambient temperatures and also at temperatures between 30° C. and 55° C.

These coating compositions provide short gel time for minimum drainage during bake, high flash points, and excellent electrical, chemical, and moisture resistance. They possess very superior cured bond strength in the temperature range of 100° C. to 160° C., for example, over 13 lb. at 100° C. for a 0.5 mil build, due to the use of a major amounts of hexamethoxy methyl melamine. They have excellent mechanical strength at elevated temperatures. They also give adequate film builds after single dip coating onto electrical conductors, such as copper or aluminum wire or foil, and provide class H thermal life.

These coating compositions have the advantage over solvent-based varnishes in that they are totally reactive, theoretically, and easily comply with all of the Environmental Protective Agency requirements for reduction of air pollutants. They have the advantages over water-based varnishes in that they are theoretically 100% reactive, and do not give off organic solvents, as used to solubilize the water base resin, or large amounts of corrosive amines and water during baking.

DESCRIPTION OF THE PREFERRED EMBODIMENTS

In the preferred method of this invention, the selected unsaturated, cyclic dicarboxylic acid is added to the aliphatic dihydric alcohol, in a suitable reaction vessel, and slowly brought to a temperature of between about 200° C. and 210° C., until an acid value of 15 or below is reached. Then, fumaric or maleic acid is added, after which the temperature is raised to between about 200° C. and 210° C., until an acid value of 15 or below is reached. The temperature is then lowered and the inhibitor is added. Finally the diallyl phthalate monomer is added.

At around room temperature the hexa methoxy methyl melamine, a selected amine stabilizer, and an effective amount of free radical initiator catalyst are added to the mixture in the reaction vessel, to provide a solventless, low viscosity, dipping and impregnating composition. The viscosity of the composition will range from about 300 cps. to about 1,500 cps. at 25° C. Optionally, about 2 pph to 6 pph (parts per hundred parts of polyester) of well known ultraviolet radiation sensitive photinitiator can also be added to the catalyzed resin.

Useful, dicarboxylic acids, added in the range of from 9 mole % to 12 mole %, are: isophthalic and endo methylene tetrahydrophthalic acid, their anhydrides and their mixtures. Use of over 12 mole % in the polyester component of this invention will cause the reaction to proceed very rapidly allowing premature gellation which may affect the storage stability. Tetrahydrophthalic acid is not used because it tends to lower heat stability. Phthalic acid is excluded because it tends to lower mechanical strength of the cured composition at high temperatures.

Aliphatic dihydric alcohol, having from about 2 to about 6 carbon atoms, added in the range of from about 35 mole % to about 40 mole %, is selected preferably from diethylene glycol, ethylene glycol, propylene glycol, and their mixture, with diethylene glycol being preferred. The useful unsaturated aliphatic dicarboxylic acid, added in the range of from about 15 mole % to about 20 mole %, is selected from fumaric acid, maleic acid, maleic anhydride and their mixtures. Use of over 20 mole % of this material provides a polyester which is very highly cross-linked, lowering storage stability. The copolymerizable unsaturated vinyl monomer is from about 25 mole % to about 40 mole % of diallyl phthalate. Use of any other monomer will lower the flash point.

Preferably, an active, dual inhibiting combination of from about 200 ppm to about 400 ppm hydroquinone and from about 100 ppm to about 200 ppm mono tertiary butyl hydroquinone is used. This combination, in the amounts set forth above, along with a selected amine stabilizer helps give long catalyzed storage life to the dipping composition of this invention, while still maintaining fast gellation times for minimum drainage during cure. This inhibitor combination is "active" in the sense that it promotes fast gellation of the composition at curing temperatures.

A major amount of hexa methoxy methyl melamine resin, in the range of from 15 parts by weight to 30 parts by weight, per 100 parts by weight of polyester, is added to dramatically improve both room temperature and hot bond strength after cure. No other melamine, melamine-formaldehyde, or urea-formaldehyde resin known to us will provide this superior hot bond strength.

Useful free radical initiator catalysts include effective amounts of cobalt naphthenate, dicumyl peroxide, and the like, as are well known in the art. These initiators also act to eliminate any tack problems in the cured composition. Effective to prolong catalyzed gel time in combination with the previously described inhibitors is the addition of from about 0.20 part to about 0.40 part by weight of an amine selected from 2-amino-2-methyl-1-propanol and preferably dimethyl ethanol amine, or their mixtures, per 100 parts of polyester, acting as a high temperature stabilizing agent.

No acidic catalysts are required for reactivity Latent catalysts, such as blocked paratoluene sulfonic acid, will not improve the bond strength of the cured resin and are detrimental to storage stability.

EXAMPLE 1

A fluid, thermally stable, high flash point, solventless, insulating composition, useful as a dipping and impregnating resin was made by admixing the following ingredients, as described below:

|  | Wt. Pounds | Wt. % | Moles | Mole % | ppm |
| --- | --- | --- | --- | --- | --- |
| 1. Isophthalic acid | 19.83 | 12.80 | 0.12 | 10.9 |  |
| 2. Fumaric acid | 25.22 | 16.28 | 0.22 | 20.1 |  |
| 3. Diethylene glycol | 51.80 | 33.44 | 0.49 | 44.5 |  |
| 4. Diallyl phthalate | 58.00 | 37.44 | 0.27 | 24.5 |  |
| 5. Hydroquinone | 0.05 | .03 |  |  | 350 |
| 6. Monotertiary butyl hydroquinone | 0.02 | .01 |  |  | 168 |

Ingredients 1 and 3 were charged into a kettle, which was set for straight distillation and minimum $N_2$ sparge, heated to 160° C., and then, at a rate of 15° C./hour, heated to about 205° C. The temperature was held until an acid value of 15 or below was reached. Ingredient 2 was then added and the mixture again brought up to about 205° C. This temperature was held until an acid value of 15 or below was reached. The temperature was then lowered, and ingredients 4, 5 and 6 added, to provide a polyester material.

To 100 parts by weight of this polyester admixture were added: 18 parts by weight of hexa methoxy methyl melamine, 0.25 parts by weight of dimethyl ethanol amine, and 1.18 parts by weight of dicumyl peroxide. This provided an insulating composition having the following properties:

Polyester solids: 60%
Viscosity at 25° C.: 500 cps. to 800 cps. Brookfield
Specific Gravity at 25° C.: 1.195+0.020
Flash Point: 166° C.
Catalyzed Storage Life at 25° C.: 1 year +
Catalyzed Storage Life at 55° C.: 50 days
Gel Time: 35 minutes at 118° C.

This composition was placed in a suitable container and ¼ inch helical coper coils were coated at a withdrawal rate of 4 inches per minute. The coated helical coils were heated to cure the resin of 150° C. for 4 hours. The following properties were measured:

Film Build/Dip On Wire: 0.5 mil
Bond Strength On Wire at 25° C.: 45 lb. for 0.5 mil build
Bond Strength On Wire at 100° C.: 25 lb. for 0.5 mil build
Bond Strength On Wire at 150° C.: 16 lb. for 0.5 mil build Additional tests made on coated copper strip included:
Dielectric Strength—dry—(volts/mil): 3000
Dielectric Strength—24 hours in water—(volts/mil): 3000

This insulating composition has outstanding physical and electrical properties, a long catalyzed shelf life, fast gel time, low viscosity, low odor, very high flash point to reduce fire hazards, and extraordinary hot bond strength for a thin insulation build; for example, 25 lb. at 100° C. for only a 0.5 mil build, versus 3 lb. at 100° C. for a 1.75 mil build for the composition described in U.S. Pat. No. 4,391,947, which patent teaches an outstanding high temperature polyester coating composition. This superior hot bond strength can be attributed to the use of major amounts of specific melamine used. The diallyl phthalate provided the outstanding flash point value. This resin was also found to easily penetrate single or plural layers of cloth-backed mica tape and fibrous glass tape, to provide resin impregnated electrical winding insulation tapes.

EXAMPLE 2

The same ingredients and procedure was used as in Example 1, except that the dimethylethanol amine was deleted as stabilizer. The same outstanding high temperature bond strength was achieved, 49 lb. at 25° C. and 18 lb. at 150° C., but catalyzed storage life at 55° C. dropped to 14 days. Gel time dropped to about 19 minutes at 118° C. This still provided a superior high temperature bond strength with reasonable gel times and acceptable storage life.

EXAMPLE 3

The same ingredients and procedure was used as in Example 1, except that 2-amino-2-methyl-1-propanol amine was substituted for the dimethyl ethanol amine with the result that high temperature bond strength was lowered slightly to about 14 lbs. at 150° C. for a 0.5 mil build, almost as good as Example 1, and still much better than the composition of U.S. Pat. No. 4,391,947. The gel time was about 34 minutes at 118° C., and catalyzed storage life at 55° C. remained at about 50 days. In another sample, the use of maleic anhydride in place of fumaric acid did not substantially lower high temperature bond strength or effect the other properties of the resin.

COMPARATIVE EXAMPLE

The same ingredients and procedure was used as in Example 1 except that the hexamethyoxy methyl melamine was eliminated without replacement. This substantially lowered high temperature bond strength to about 6 lbs. at 150° C. for a 0.5 mil build.

I claim:

1. A fluid, high bond strength, high flash point, solventless, insulating composition, comprising:
    (1) 100 parts by weight of a polyester composition consisting essentially of the admixture:
        (A) from 9 mole % to 12 mole % of a dicarboxylic acid selected from the group consisting of isophthalic acid, endo methylene tetrahydrophthalic acid, their anhydrides, and their mixtures;
        (B) from about 15 mole % to about 20 mole % of an unsaturated aliphatic dicarboxylic acid;
        (C) from about 35 mole % to about 40 mole % of an aliphatic dihydric alcohol;
        (D) from about 25 mole % to about 40 mole % of diallyl phthalate;
        (E) an effective amount of an inhibiting agent;
    (2) from 15 parts by weight to 30 parts by weight of hexamethoxy methyl melamine; and
    (3) an effective amount of a free radical initiator catalyst.

2. The composition of claim 1, where from about 0.20 part to about 0.40 part by weight of an amine selected from the group consisting of dimethyl ethanol amine, 2-amino-2-methyl-1-propanol, and mixtures thereof, are added per 100 parts of the polyester composition, as a stabilizing agent, and the inhibiting agent consists of:
    (A) 200 ppm to 400 ppm hydroquinone, and
    (B) 100 ppm to 200 ppm mono tertiary butyl hydroquinone; the combination of inhibiting agent and stabilizing agent being effective to provide high temperature storage stability.

3. The composition of claim 1, where the dicarboxylic acid is isophthalic acid, and the aliphatic dihydric alcohol is selected from the group consisting of diethylene glycol, ethylene glycol, propylene glycol, and mixtures thereof.

4. The composition of claim 1, where the free radical initiator catalyst is dicumyl peroxide, the unsaturated aliphatic dicarboxylic acid is selected from the group consisting of fumaric acid, maleic acid, maleic anhydride, and mixtures thereof, and the aliphatic dihydric alcohol is diethylene glycol.

5. The composition of claim 1, characterized as having class F-H thermal capability and a bond strength on wire at 100° C. of over about 13 lb. for a 0.5 mil insulation build.

6. The composition of claim 1 applied to an article and cured.

7. The article of claim 6 being an electric conductor.

8. A fluid, high bond strength, high flash point, solventless, storage stable, insulating composition, useful as a dipping and impregnating resin, consisting essentially of:
    (1) 100 parts by weight of a polyester composition consisting essentially of the admixture:
        (A) from 9 mole % to 12 mole % of isophthalic acid;
        (B) from about 15 mole % to about 20 mole % of fumaric acid;
        (C) from about 35 mole % to about 40 mole % of diethylene glycol;
        (D) from about 25 mole % to about 40 mole % of diallyl phthalate;
        (E) an active, dual inhibiting agent combination consisting of:
            (i) 200 ppm to 400 ppm hydroquinone, and
            (ii) 100 ppm to 200 ppm mono tertiary butyl hydroquinone;
    (2) from 15 parts by weight to 30 parts by weight of hexamethoxy methyl melamine;
    (3) from about 0.20 part to about 0.40 part by weight of dimethyl ethanol amine, as a stabilizing agent; and
    (4) an effective amount of a free radical initiator catalyst.

9. The composition of claim 8, where the free radical initiator catalyst is dicumyl peroxide.

10. The composition of claim 8, characterized as having class F-H thermal capability and a bond strength on wire at 100° C. of over about 13 lb. for a 0.5 mil insulation build.

11. The composition of claim 8 applied to an article and cured.

12. The article of claim 11 being an electric conductor.

* * * * *